United States Patent
Bergman et al.

(10) Patent No.: US 8,854,978 B2
(45) Date of Patent: Oct. 7, 2014

(54) HSUPA CARRIER ACTIVATION NOTIFICATION

(75) Inventors: Johan Bergman, Stockholm (SE); Klas Johansson, Sundbyberg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 145 days.

(21) Appl. No.: 13/140,926

(22) PCT Filed: Oct. 15, 2009

(86) PCT No.: PCT/SE2009/051171
§ 371 (c)(1),
(2), (4) Date: Jun. 20, 2011

(87) PCT Pub. No.: WO2010/071547
PCT Pub. Date: Jun. 24, 2010

(65) Prior Publication Data
US 2011/0249566 A1    Oct. 13, 2011

Related U.S. Application Data

(60) Provisional application No. 61/139,250, filed on Dec. 19, 2008.

(51) Int. Cl.
| H04L 12/26 | (2006.01) |
| H04J 1/16 | (2006.01) |
| G08C 15/00 | (2006.01) |
| G06F 11/00 | (2006.01) |
| H04W 4/00 | (2009.01) |

(52) U.S. Cl.
USPC ........... 370/241; 370/328; 370/331; 455/436; 455/440

(58) Field of Classification Search
USPC .......... 370/241–252, 328–352; 455/422–450, 455/517–522
See application file for complete search history.

(56) References Cited

U.S. PATENT DOCUMENTS

| 7,146,175 | B2 * | 12/2006 | Rune et al. | 455/453 |
| 7,343,176 | B2 * | 3/2008 | Ahn et al. | 455/560 |
| 7,486,954 | B2 * | 2/2009 | Lee et al. | 455/442 |
| 7,515,562 | B2 * | 4/2009 | Lim et al. | 370/331 |

(Continued)

FOREIGN PATENT DOCUMENTS

| CN | 1765140 A | 4/2006 |
| CN | 101023645 A | 8/2007 |

(Continued)

OTHER PUBLICATIONS

International Search Report for PCT/SE2009/051171, mailed Feb. 17, 2010.

(Continued)

*Primary Examiner* — Man Phan
(74) *Attorney, Agent, or Firm* — Nixon & Vanderhye, P.C.

(57) ABSTRACT

A radio access network (20) comprises a serving base station (28$_S$) configured to control a serving cell (34$_S$) in an active set of a wireless terminal (30) as well as a non-serving base station (28$_N$) configured to control a non-serving cell (34$_N$) in the active set of the wireless terminal (30). Methods and apparatus are provided for signaling, to the non-serving base station (28$_N$), information indicating a subset of active carriers in the set of at least two carriers.

21 Claims, 13 Drawing Sheets

(56) References Cited

U.S. PATENT DOCUMENTS

| | | | |
|---|---|---|---|
| 7,609,661 B2 * | 10/2009 | Chae et al. | 370/310 |
| 7,961,700 B2 * | 6/2011 | Malladi et al. | 370/345 |
| 8,126,403 B2 * | 2/2012 | Wang Helmersson et al. | 455/63.1 |
| 8,126,462 B2 * | 2/2012 | Thakare | 455/436 |
| 2006/0274712 A1 | 12/2006 | Malladi et al. | |

FOREIGN PATENT DOCUMENTS

| | | |
|---|---|---|
| CN | 101242214 A | 8/2008 |
| WO | WO 2007/072936 A1 | 6/2007 |
| WO | WO 2007/112143 A2 | 10/2007 |
| WO | WO 2008/052012 A2 | 5/2008 |

OTHER PUBLICATIONS

3GPP: "Multi-Carrier HSPA evolution" 3GPP RP-081142—Online, Dec. 2008.

RAN3 (Ericsson): "TP: Iub/Iur aspects of Dc-HSUPA", 3GPP Draft, May 2009.

Japanese Office Action issued in Application No. 2011-542058 dated Jun. 18, 2013.

State Intellectual Property Office of People's Republic China Search Report issued in Application No. 200980151649.0 dated Jul. 22, 2013.

Chinese Office Action issued in Application 200980151649.0 dated Jul. 30, 2013.

Chinese Office Action and English translation thereof mailed Apr. 18, 2014 in Chinese Patent Application 200980151649.0.

* cited by examiner

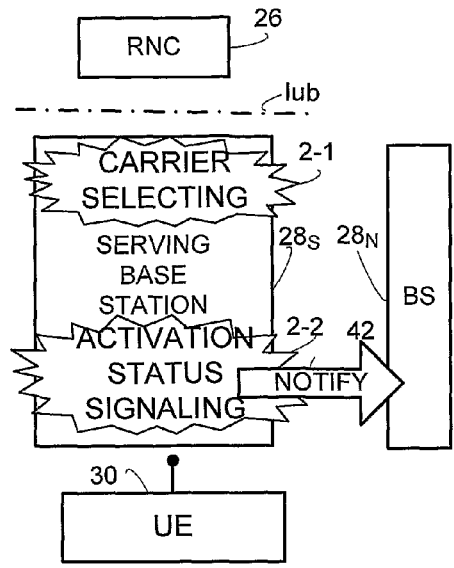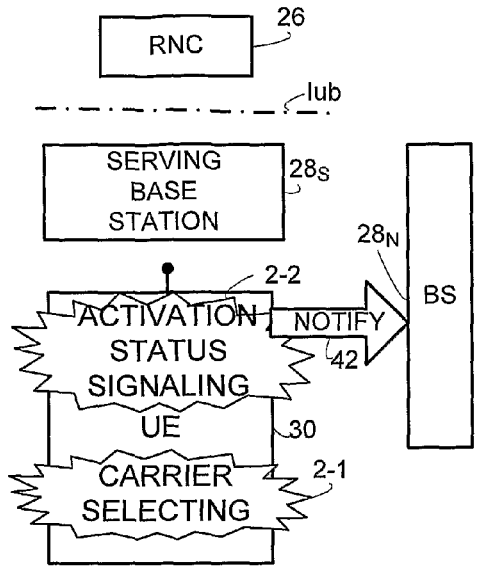
Fig. 3A    Fig. 3B
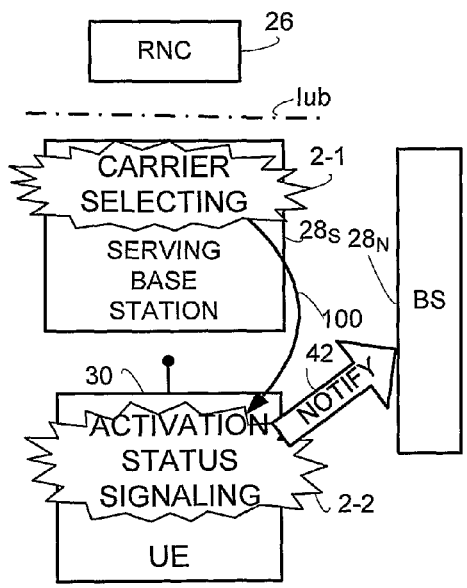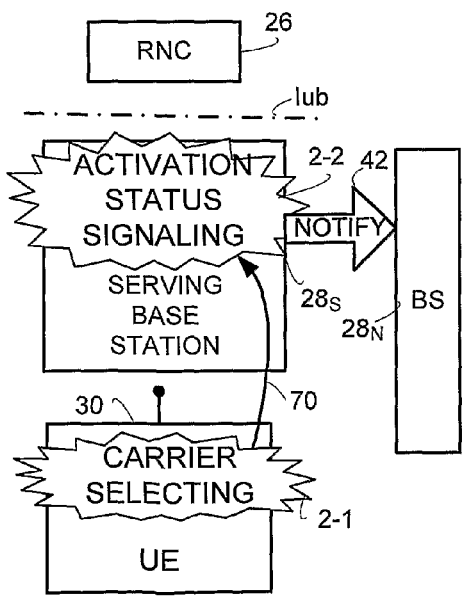
Fig. 3C    Fig. 3D

| SIGNAL TYPE (OPTIONAL) | ADDRESSEE (OPTIONAL) | SENDER (OPTIONAL) | ACTIVATED HSUPA CARRIER(S) ID | ACTIVATION LEVEL |
|---|---|---|---|---|
Fig. 15
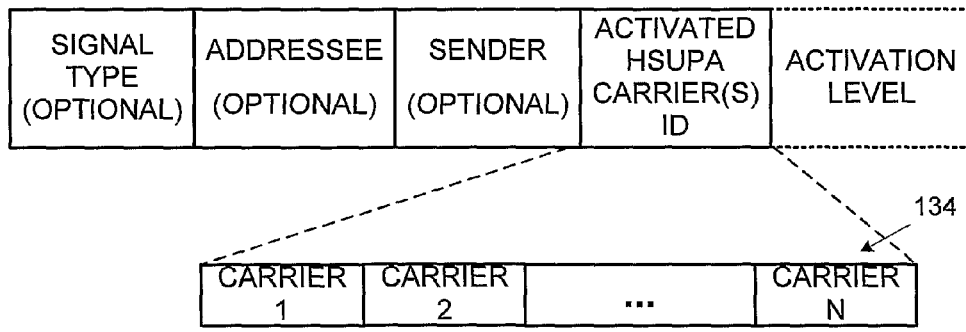
Fig. 16
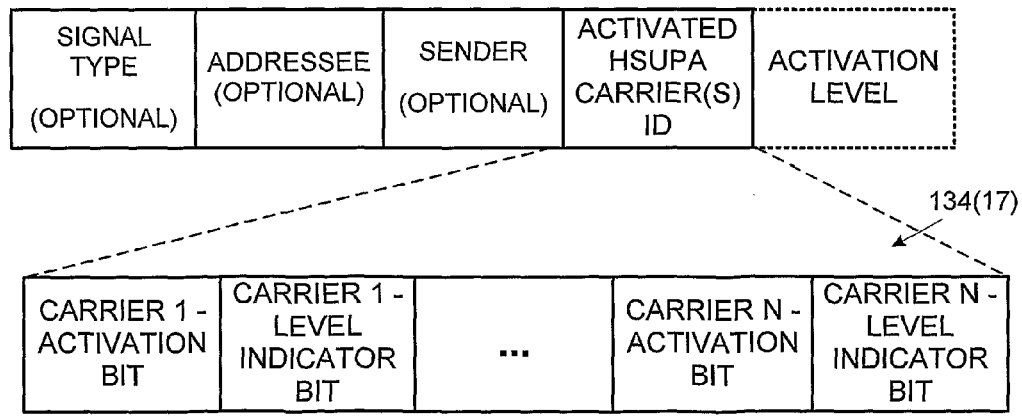
Fig. 17

HSUPA CARRIER ACTIVATION NOTIFICATION

This application is the U.S. national phase of International Application No. PCT/SE2009/051171 filed 15 Oct. 2009 which designated the U.S. and claims the benefit of U.S. Provisional Application No. 61/139,250 filed 19 Dec. 2008, the entire contents of each of which are hereby incorporated by reference.

TECHNICAL FIELD

This invention pertains to telecommunications, and particularly to multicarrier uplink transmissions.

BACKGROUND

In a typical cellular radio system, wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks is also called a "NodeB". A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, several base stations are typically connected (e.g., by landlines or microwave) to a radio network controller (RNC). The radio network controller supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN is essentially a radio access network using wideband code division multiple access for user equipment units (UEs).

In a forum known as the Third Generation Partnership Project (3GPP), telecommunications suppliers propose and agree upon standards for third generation networks and UTRAN specifically, and investigate enhanced data rate and radio capacity. The Third Generation Partnership Project (3GPP) has undertaken to evolve further the UTRAN and GSM based radio access network technologies. One result of the forum's work is the High Speed Packet Access (HSPA).

In a High Speed Packet Access (HSPA) network, a wireless terminal is connected to a serving cell. The serving cell is responsible for the data scheduling for the wireless terminal. The wireless terminal, alternately referred to as a user equipment unit (UE), may also be connected to one or more non-serving cells. The serving cell and any non-serving cells to which the wireless terminal is connected collectively make up the active set for the wireless terminal.

In a HSPA network a serving cell is under the control of a base station (NodeB) that is here referred to as the serving NodeB. Likewise, other NodeBs controlling non-serving cells in the active set can be referred to as non-serving NodeBs. Just like the serving NodeB, the non-serving NodeBs are able to receive uplink data transmissions from the wireless terminal (UE), and the fact that they are able to do so provides a so-called soft handover gain. The non-serving NodeBs are also able to moderate the transmissions from the wireless terminal (UE) through transmit power control (TPC) commands and relative grants (RG) in order to avoid too large inter-cell interference from the wireless terminal (UE) towards cells controlled by the non-serving NodeBs.

High Speed Downlink Packet Access (HSDPA) for the downlink was introduced in 3GPP WCDMA specification Release 5. Multi-carrier High Speed Downlink Packet Access (MC-HSDPA) comprises simultaneous High Speed Downlink Packet Access (HSDPA) transmission over more than one downlink carrier to a wireless terminal (UE).

The High Speed Downlink Packet Access (HSDPA) was followed by introduction of High Speed Uplink Packet Access (HSUPA) with its Enhanced Dedicated Channel (E-DCH) in the uplink in 3GPP WCDMA specification Release 6. HSUPA uses its uplink enhanced dedicated channel (E-DCH) for its E-DCH employs link adaptation methods similar to those employed by HSDPA. In its scheduled mode HSUPA uses a packet scheduler (similar to HSDPA), but also operates on a request-grant procedure. According to request-grant procedure, wireless terminals individually request permission to send data. In response to such requests, the scheduler at the NodeB decides when and how many wireless terminals will be allowed to do so. A request for transmission contains data about the wireless terminal, e.g., the state of the transmission buffer and the queue and the wireless terminal's available power margin. In addition to its scheduled mode of transmission, for HSUPA the standards also allows a self-initiated transmission mode from the UEs, denoted non-scheduled.

At Layer 1, HSUPA introduces new physical channels E-AGCH (Absolute Grant Channel), E-RGCH (Relative Grant Channel), F-DPCH (Fractional-DPCH), E-HICH (E-DCH Hybrid ARQ Indicator Channel), E-DPCCH (E-DCH Dedicated Physical Control Channel) and E-DPDCH (E-DCH Dedicated Physical Data Channel). E-DPDCH is used to carry the E-DCH Transport Channel; E-DPCCH is used to carry the control information associated with the E-DCH.

Multi-carrier High Speed Downlink Packet Access (MC-HSDPA) has been introduced in 3GPP Release 8. As a next step, multi-carrier High Speed Uplink Packet Access (MC-HSUPA) has been proposed to be included in 3GPP Release 9. Multi-carrier High Speed Packet Access (MC-HSPA) is described, e.g., in Johansson, Klas, et al., "Multi-Carrier HSPA Evolution"; http://www.ericsson.com/technology/research_papers/atsp/doc/multi-carrier_hspa_evolution.pdf, 2009, incorporated herein by reference in its entirety. While multi-carrier transmission does not increase "spectral efficiency" of a system (maximum achievable throughput [bps/cell/Hz]), the experienced user data rates are likely to increase significantly, in particular for bursty packet data traffic at low and moderate load. Moreover, by exploiting a wider bandwidth per connection, power inefficient higher order modulation schemes can be avoided, and the practical as well as theoretical peak data rate of the system are increased.

SUMMARY

The technology disclosed herein serves, e.g., to provide information to one or more non-serving base stations (i.e., non-serving Node Bs) in a multi-carrier HSUPA system with information indicating which uplink carriers are currently activated for a wireless terminal.

In one of its aspects the technology disclosed herein concerns a method in a serving base station for signal interaction with a non-serving base station. The serving base station is configured to control a serving cell in an active set of a wireless terminal. The non-serving base station is configured to control one or more non-serving cells in the active set of the wireless terminal. The wireless terminal is configured for multi carrier uplink transmissions on a set of at least two carriers. The method comprises the serving base station, transmitting to the non-serving base station, a signal comprising information indicating a subset of active carriers in the set of at least two carriers.

In one example embodiment and mode of the method in the serving base station further comprises transmitting the signal directly to the non-serving base station on an interface between the serving base station and the non-serving base station. In another example embodiment and mode of the method in the serving base station further comprises transmitting the signal on an interface between the serving base station and a radio network controller node for forwarding of the information to the non-serving base station.

In another of its aspects the technology disclosed herein concerns a method in a non-serving base station configured to control one or more non-serving cells in an active set of a wireless terminal. The wireless terminal is configured for multi carrier uplink transmissions on a set of at least two carriers. The method comprises the non-serving base station receiving a signal comprising information indicating a subset of active carriers in the set of at least two carriers.

In one example embodiment and mode of the method in the in the non-serving base station the signal is received on an interface between the non-serving base station and a serving base station which controls a serving cell in the active set of the wireless terminal. In another example embodiment and mode of the method in the in the non-serving base station the signal is received on an interface between the non-serving base station and a radio network controller node.

An example embodiment and mode of the method in the non-serving base station further comprises adapting monitoring of uplink transmissions from the wireless terminal in accordance with the received information.

In another of its aspects the technology disclosed herein concerns a method in a wireless terminal for signal interaction with a non-serving base station. The non-serving base station is configured to control one or more non-serving cells in an active set of the wireless terminal. The wireless terminal is configured for multi carrier uplink transmissions on a set of at least two carriers. The method comprises the wireless terminal transmitting, to the non-serving base station, a signal comprising information indicating a subset of active carriers in the set of at least two carriers.

In some example implementations of methods described herein the information includes a list of all activated carriers in the set of at least two carriers. In other example implementations of methods described herein the information includes a list of all deactivated carriers in the set of at least two carriers.

In some example implementations of methods described herein the information indicates changes in activation levels for the carriers as compared to a previous situation.

In another of its aspects the technology disclosed herein concerns a base station of a radio access network (20) which is configured to control a serving cell in an active set of a wireless terminal. The wireless station is configured for multi carrier uplink transmission on a set of at least two carriers. The base station comprises signal transmitting means configured to transmit a signal with information indicating a subset of active carriers in the set of at least two carriers to a non-serving base station ($28_N$). The non-serving base station is configured to control one or more non-serving cells in the active set of the wireless terminal.

In an example embodiment the signal is transmitted directly to the non-serving base station on an interface between the base station and the non-serving base station. In another example embodiment the signal is transmitted on an interface between the base station and a radio network controller node for forwarding of the information to the non-serving base station.

In an example embodiment the signal is transmitted after the serving base station has decided to activate or deactivate at least one carrier in said set of at least two carriers.

In another of its aspects the technology disclosed herein concerns a base station of a radio access network configured to control one or more non-serving cells in an active set of a wireless terminal. The wireless terminal is configured for multi carrier uplink transmissions on a set of at least two carriers. The base station comprises signal handling means and carrier monitoring means. The signal handling means is configured to receive a signal comprising information indicating a subset of active carriers in the set of at least two carriers. The carrier monitoring means is configured to adapt monitoring of uplink transmissions from the wireless terminal in accordance with the information.

In an example embodiment the signal is received on an interface between the base station and a serving base station which controls a serving cell in the active set of the wireless terminal. In another example embodiment the signal is received on an interface between the base station and a radio network controller node.

In some example base station embodiments the information includes a list of all activated carriers in the set of at least two carriers. Alternatively in other example base station embodiments the information includes a list of all deactivated carriers in the set of at least two carriers.

In some example base station embodiments the information indicates changes in activation levels for the carriers as compared to a previous situation.

In another of its aspects the technology disclosed herein concerns a wireless terminal configured for multi carrier uplink transmissions on a set of at least two carriers and having an active set comprising one or more non-serving cells controlled by a non-serving base station. The wireless terminal comprises signal transmission means configured to transmit a signal to the non-serving base station. The signal comprises information indicating a subset of active carriers in the set of at least two carriers.

In one of its aspects the technology disclosed herein concerns a method of operating a radio access network. The radio access network (RAN) comprises a serving base station configured to control a serving cell in an active set of a wireless terminal as well as a non-serving base station configured to control a non-serving cell in the active set of the wireless terminal. The serving base station and the wireless terminal are referred to as sub-Iub entities inasmuch as they are hierarchically positioned below an Iub interface, i.e., an interface between a radio network control node and base station(s) controlled by the radio network control node. The method comprises (1) selecting for (de)activation at least one uplink carrier of a set of at least two (de)activated uplink carriers for multi carrier uplink transmissions from a wireless terminal; (2) at least initiating signaling to a non-serving base station of information indicating a subset of active carriers in the set of at least two carriers; and performing the carrier selecting act (1) and the activation status signaling act (2) at one or more of the sub-Iub entity(ies). As used herein, "activation status" can encompass an indication of whether an uplink carrier is activated or deactivated.

In various embodiments and modes carrier selecting act and activation status signaling act are performed by one or a combination of sub-Iub entity(ies). For example, in one example embodiment and mode the carrier selecting act and the activation status signaling act are performed at the serving base station. In another example embodiment and mode the carrier selecting act and the activation status signaling act are performed at the wireless terminal. In yet another example embodiment and mode the carrier selecting act is performed at the serving base station and the activation status signaling act is performed at the wireless terminal. In still another example embodiment and mode the carrier selecting act is performed at the wireless terminal and the activation status signaling act is performed at the serving base station.

The signaling performed by the sub-Iub entity is to a non-serving base station of information indicating a subset of active carriers in the set of at least two carriers. In some example embodiments and modes the activation status comprises an indication of a level of activation utilization of an uplink carrier of the subset. In an example implementation the level of utilization indicates a type of carrier that is activated for the uplink carrier of the subset. In another example implementation the level of utilization indicates a temporal dimension for the uplink carrier of the subset. In another example implementation the activation status comprises carrier identification of the at least a subset of the uplink carrier in the set of the at least two uplink carrier.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 3A-FIG. 3F are schematic views illustrating various embodiments and modes wherein a carrier selecting act and an activation status signaling act are performed by one or a combination of sub-Iub entity(ies).

FIG. 15 is a diagrammatic view of an example format of a sub-Iub generated HSUPA carrier activation notification signal.

FIG. 16 is a diagrammatic view of an example format of a sub-Iub generated HSUPA carrier activation notification signal and further showing a first example form of a bitmap representation of an activated HSUPA carrier field.

FIG. 17 is a diagrammatic view of an example format of a sub-Iub generated HSUPA carrier activation notification signal and further showing a second example form of a bitmap representation of an activated HSUPA carrier field.

DETAILED DESCRIPTION

Figure 1:
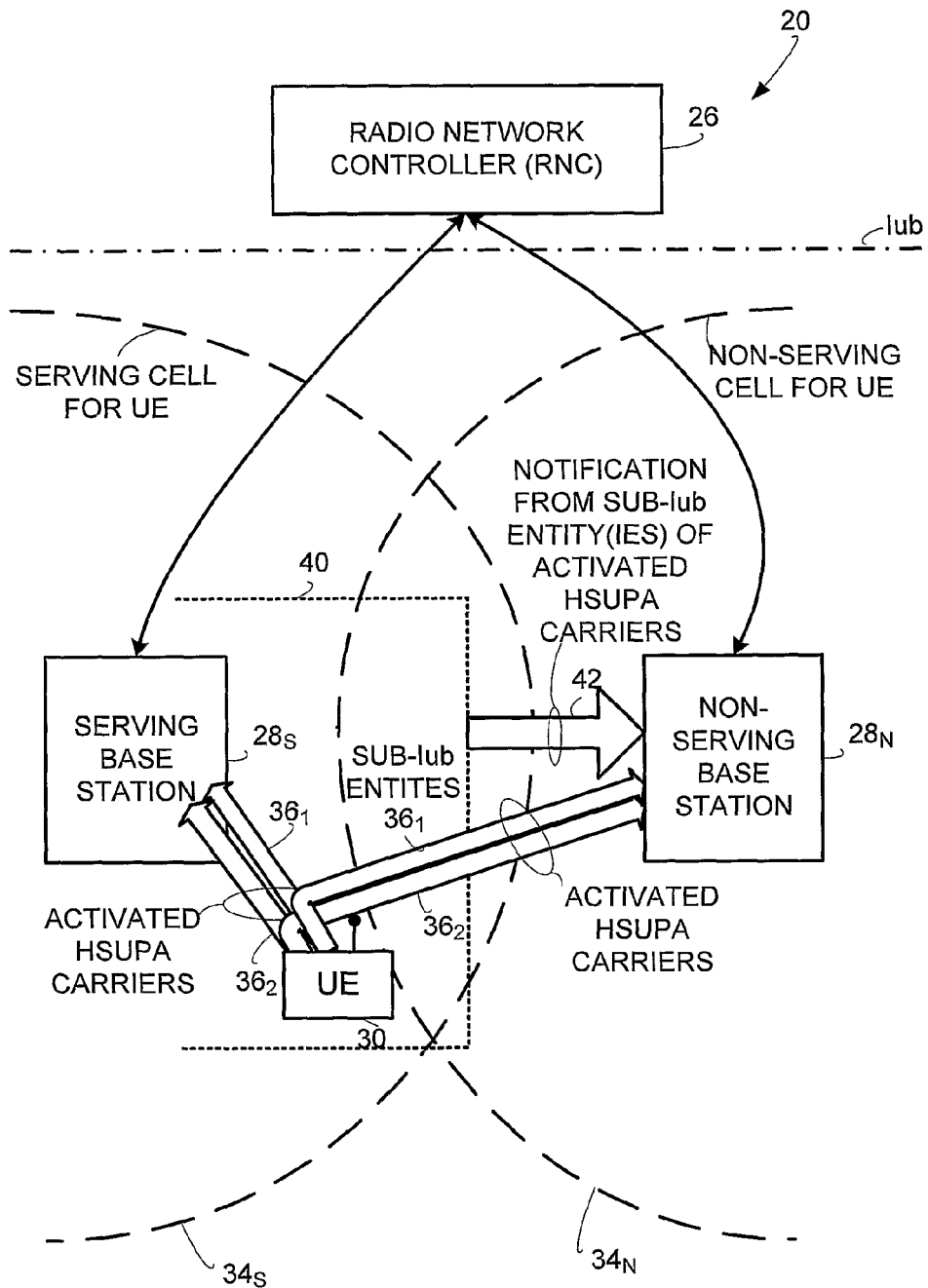
FIG. 1 is a schematic view of example architecture for a portion of a radio access network which provides high speed packet access (HSPA).

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "computer", "processor" or "controller" may be provided through the use of dedicated hardware as well as hardware capable of executing software in the form of coded instructions stored on computer readable medium. A computer is generally understood to comprise one or more processors, and the terms computer and processor may be employed interchangeably herein. When provided by a computer or processor, the functions may be provided by a single dedicated computer or processor, by a single shared computer or processor, or by a plurality of individual computers or processors, some of which may be shared or distributed. Such functions are to be understood as being computer-implemented and thus machine-implemented. Moreover, use of the term "processor" or "controller" shall also be construed to refer to other hardware capable of performing such functions and/or executing software, and may include, without limitation, digital signal processor (DSP) hardware, reduced instruction set processor, hardware (e.g., digital or analog) circuitry, and (where appropriate) state machines capable of performing such functions.

For a given wireless terminal (UE) operating with MC-HSUPA capabilities (e.g., a "MC-HSUPA UE"), transmission on more than one uplink carrier simultaneously will primarily be useful if the current load (channel utilization) of other wireless terminals (UEs) on the carriers of interest (the uplink carriers used for MC-HSUPA) is sufficiently low. Otherwise single-carrier transmission could be more preferred in order to achieve orthogonal uplink transmissions (by, as far as possible, having different wireless terminals (UEs) transmitting on different carriers) and to minimize overhead and battery consumption. In particular, it would be beneficial to control the selection of carriers for MC-HSUPA UEs connected to the same serving Node-B and the same sector (i.e. set of cells with similar coverage area). Carrier selection control is desirable because intra-cell interference typically will dominate the uplink cell load.

The radio network controller (RNC) can select a set of uplink carriers suitable for MC-HSUPA with respect to mobility and overall system load, and can configure radio links on one or several carriers for a given wireless terminal (UE) accordingly. However, in terms of speed of carrier selection for uplink transmissions by the wireless terminal (UE), it is preferable that the actual selection of uplink carriers be performed at the serving NodeB and/or in the wireless terminal (UE). That is, preferably the serving NodeB and/or the wireless terminal (UE) perform uplink carrier selection by selecting among the set of carriers determined by the RNC. This preference occurs because the wireless terminal (UE) is aware of the transmit power availability and instantaneous buffer load; the serving NodeB can adapt the carrier configuration to traffic load, interference, quality of service (QoS) requirements, and other aspects that involve other wireless terminal (UEs).

The inventors of the technology disclosed herein have recognized that, if the serving NodeB and/or the wireless terminal (UE) control the activation of uplink carriers, i.e. initiate activation and or/deactivation of uplink carriers, non-serving Node BS controlling non-serving cells in the active set of the wireless terminal (UE) will not be aware of whether a given uplink carrier is activated or not for the wireless terminal (UE). Therefore, in such case such Node Bs (controlling non-serving cells) will try to detect data continuously on each uplink carrier for which a radio link has been configured by the RNC, not knowing which configured uplink carrier has actually been activated for MC-HSUPA. Such a blind detection of activity on each carrier will cause unnecessary overhead, especially in terms of hardware consumption in the non-serving NodeBs. Moreover, there is a risk that the non-serving cells will transmit power control commands and other erroneous control signaling until the new situation has been detected.

Thus, as discussed above, it can be beneficial to be able to dynamically control the activation of uplink carriers for MC-HSUPA for a particular wireless terminal (UE). The uplink carriers should be selected from a set of (candidate) uplink carriers configured by the RNC. The selection could be made by the serving NodeB and/or the wireless terminal (UE).

FIG. 1 illustrates in representative form a radio access network (RAN) 20 which comprises a radio network controller (RNC) node 26; plural radio base stations $28_S$ and $28_N$, and wireless terminal 30. The wireless terminal 30 communicates across a radio or air interface with one or more radio base stations. Each base station 28 can serve one or more cells, although for simplicity FIG. 1 shows each base station as serving only one cell. The wireless terminal 30 and/or an uplink carrier utilized thereby is said to have an "active set", e.g., a collection of cells via which wireless terminal 30 is currently connected to the radio access network 20. In the particular situation shown in FIG. 1, radio base station $28_S$ is a serving base station and thus is configured to control a serving cell $34_S$ in an active set of wireless terminal 30; radio base station $28_N$ is a non-serving base station and thus is configured to control a non-serving cell $34_N$ in the active set of wireless terminal 30.

The wireless terminal 30 is configured for multi carrier uplink transmissions, e.g., for transmission to serving base station $28_S$ over at least a first HSUPA carrier $36_1$ and a second HSUPA carrier $36_2$.

As explained above, it is advantageous to notify to non-serving base station $28_N$ of the identities of the particular ones of the available or candidate uplink carriers which are actually activated for use by wireless terminal 30 as the HSUPA carrier $36_1$ and a second HSUPA carrier $36_2$, since such notification simplifies operation and lessens overhead at the non-serving base station $28_N$.

The serving base station $28_S$ and wireless terminal 30 are referred to herein (and illustrated in FIG. 1) as "sub-Iub entities" since, e.g., they are hierarchically positioned below an Iub interface, i.e., the Iub interface between radio network controller (RNC) node 26 and base station(s) controlled by radio network controller (RNC) node 26. According to the technology disclosed herein, and as shown by bracket 40 in FIG. 1, signaling to the non-serving base station $28_N$ of information indicating a subset of active carriers in the set of at least two carriers in a set of candidate carriers is initiated by the sub-Iub entities, i.e., either serving base station $28_S$ and/or wireless terminal 30. As used herein, "activation status" can encompass an indication of whether an uplink carrier is activated or deactivated. FIG. 1 thus shows sub-Iub generated HSUPA carrier activation notification 42 to non-serving base station non-serving base station $28_N$.

Figure 2A:
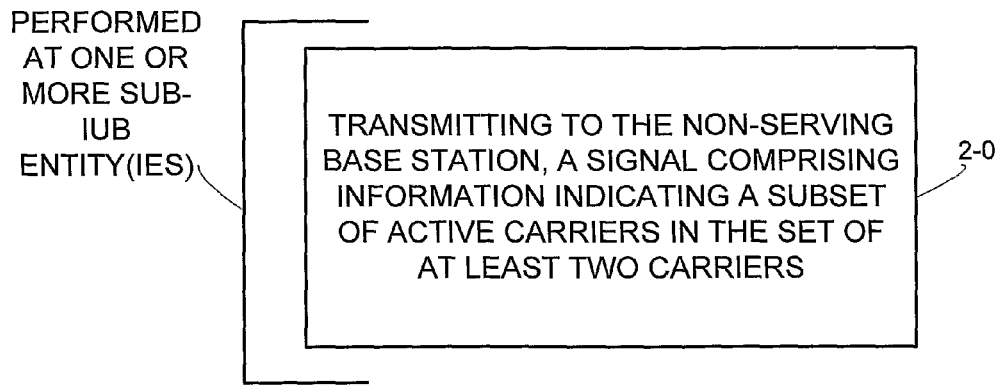
FIG. 2A is a flowchart showing a general, representative act or step which can be performed by a serving base station or a wireless terminal for providing a sub-Iub generated HSUPA carrier activation notification to a non-serving base station.

FIG. 2A represents example embodiments and modes comprising an act 2-0 that can be performed by a sub-Iub entity, i.e., by serving base station $28_S$ or by wireless terminal 30. Act 2-0 comprises transmitting to the non-serving base station, a signal comprising information indicating a subset of active carriers in the set of at least two carriers. The signal of act 2-0 is also referred to herein as an activation status signal or activation status signaling. Non-limiting example ways in which the signal can be transmitted (either by the serving base station $28_S$ or by wireless terminal 30) are understood in conjunction with other illustrated embodiments and modes described herein, such as those of FIG. 2B, FIG. 3A-FIG. 3F, and FIG. 6A and FIG. 6B, for example.

Figure 2B:
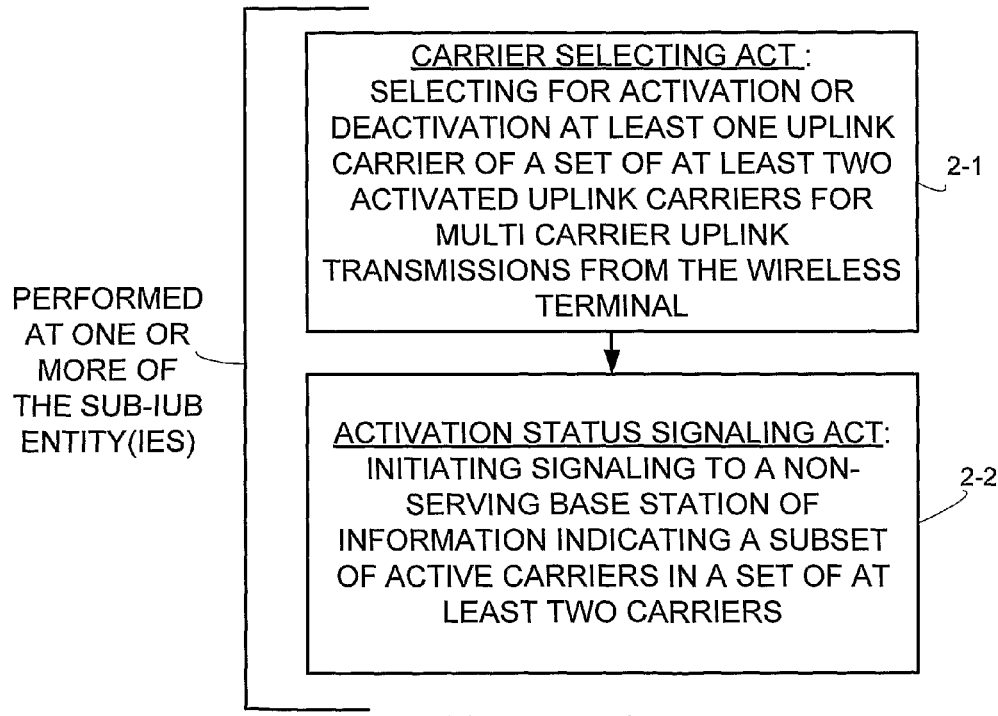
FIG. 2B is a flowchart showing general, representative acts or steps included in general method of operating a radio access network such as radio access network (RAN) which provides the sub-Iub generated HSUPA carrier activation notification to a non-serving base station.

FIG. 2B shows general, representative acts or steps included in general method of operating a radio access network such as radio access network (RAN) 20 which provides the sub-Iub generated HSUPA carrier activation notification to a non-serving base station. Act 2-1 of the method is a carrier selecting act and comprises selecting for activation or deactivation at least one uplink carrier of a set of at least two activated uplink carriers for multi carrier uplink transmissions from the wireless terminal. Act 2-2 (comparable to act 2-0 of FIG. 2A) is an activation status signaling act and comprises at least initiating signaling to a non-serving base station of information indicating a subset of active carriers in the set of at least two carriers. Further, as shown in FIG. 2B, the carrier selecting act 2-1 and the activation status signaling act 2-2 are performed at one or more of the sub-Iub entity(ies), e.g., at one or both of serving base station $28_S$ and wireless terminal 30.

In various embodiments and modes carrier selecting act 2-1 and the activation status signaling act 2-2 are performed by one or a combination of sub-Iub entity(ies). For example, in one example embodiment and mode illustrated in FIG. 3A the carrier selecting act 2-1 and the activation status signaling act 2-2 are performed at serving base station $28_S$. In another example embodiment and mode illustrated in FIG. 3B the carrier selecting act 2-1 and the activation status signaling act 2-2 are performed at wireless terminal 30. In yet another example embodiment and mode illustrated in FIG. 3C the carrier selecting act 2-1 is performed at serving base station $28_S$ and the activation status signaling act 2-2 is performed at wireless terminal 30. In still another example embodiment and mode illustrated in FIG. 3D the carrier selecting act 2-1 is performed at wireless terminal 30 and the activation status signaling act 2-2 is performed at serving base station $28_S$.

Thus, in some example embodiments, such as those depicted by FIG. 3A and FIG. 3C, the selection of uplink carrier(s) for the MC-HSUPA is made by the serving NodeB, e.g., by serving base station $28_S$. In accordance with 3GPP Releases 6, 7, and 8 the serving NodeB already sends data rate grants for HSUPA/EUL to the wireless terminal (UE). Thus, in example implementations of the technology disclosed herein the serving NodeB is also in control of the activation and deactivation of uplink carriers (e.g., HSUPA carriers 36) for its served MC-HSUPA wireless terminals.

Figure 3E:
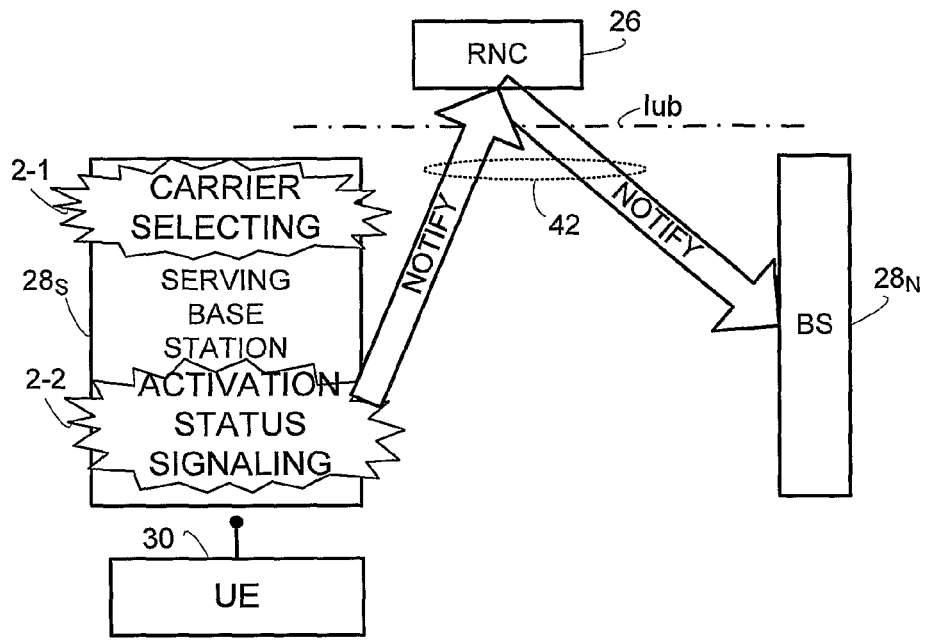
Figure 3F:
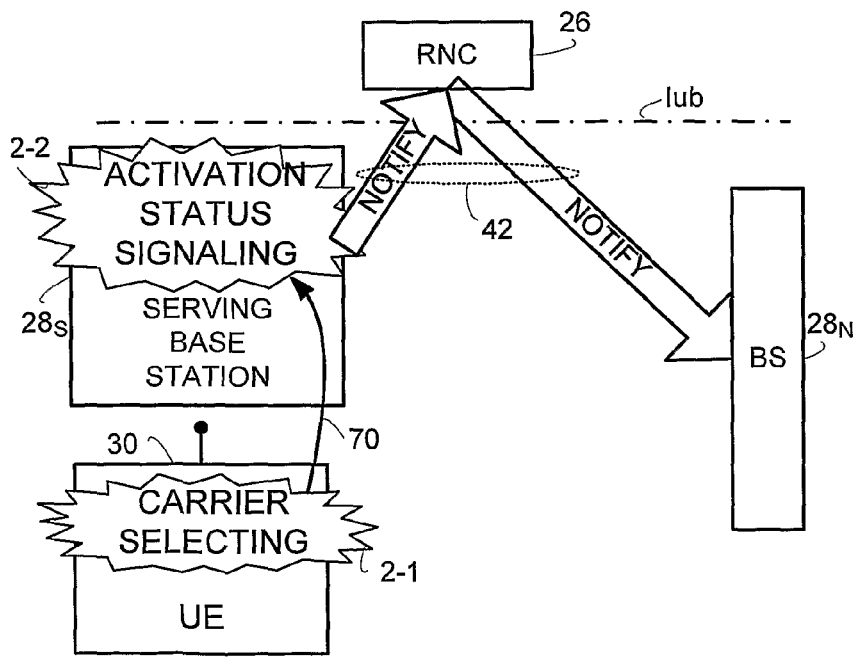

FIG. 3A-FIG. 3E show various embodiments and modes wherein a carrier selecting act (such as act 2-1) and an activation status signaling act (such as act 2-2) are performed by one or a combination of sub-Iub entity(ies). In other words, FIG. 3A-FIG. 3E show a matrix of ways in which the responsibilities for the carrier selecting act (such as act 2-1) and an activation status signaling act (such as act 2-2) can be delegated or distributed. In particular, FIG. 3A shows carrier selecting act 2-1 and activation status signaling act 2-2 being performed by serving radio base station $28_S$. FIG. 3B shows carrier selecting act 2-1 and activation status signaling act 2-2 being performed by wireless terminal 30. FIG. 3C shows carrier selecting act 2-1 being performed by serving radio base station $28_S$ and activation status signaling act 2-2 being performed by wireless terminal 30. FIG. 3D shows carrier selecting act 2-1 being performed by wireless terminal 30 and activation status signaling act 2-2 being performed by serving radio base station $28_S$. In each of FIG. 3A-FIG. 3D the HSUPA carrier activation notification 42 is depicted generally as being sent from either serving radio base station $28_S$ or wireless terminal 30 to non-serving radio base station $28_N$. FIG. 3E and FIG. 3F are special cases of the respective scenarios of FIG. 3A and FIG. 3D for showing that the FIG. 3A and FIG. 3B scenarios also encompass sending the HSUPA carrier activation notification 42 via the radio network controller node (RNC) 26.

Figure 4:
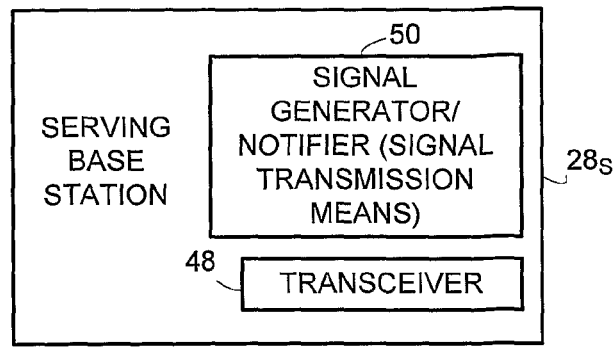
FIG. 4 is a schematic view of a serving base station according to an example embodiment which is configured to send a HSUPA carrier activation notification to a non-serving base station.

FIG. 4 shows an example embodiment of serving base station $28_S$, e.g., the radio base station which is configured to control serving cell $34_S$ in the active set of wireless terminal 30 and to send a sub-Iub generated HSUPA carrier activation notification to the non-serving base station $28_N$. The serving base station $28_S$ comprises receiver 48 (included in a transceiver of FIG. 4) and a HSUPA carrier activation notification generator, e.g., signal generator 50. The signal generator 50 is also described as the signal transmission means. In the entities described herein, mention or illustration of a transceiver does not require that a particular entity have both transmitter and receiver capabilities in a same unit or piece of equipment, but instead merely indicates that the entity itself has transmitter and receiver capabilities regardless of how the transmitting and receiving functionalities may be located or distributed. The receiver 48 is configured to receive a set of at least two uplink carriers (e.g., HSUPA carriers $36_1$ and $36_2$) over the air interface from wireless terminal 30. In some implementations the set may comprise more than two uplink carriers. The signal generator 50 serves as an active uplink carrier notifier, and is configured to signal a non-serving base station (e.g., non-serving base station $28_N$) with information indicating a subset of active carriers in the set of at least two carriers.

Figure 5:
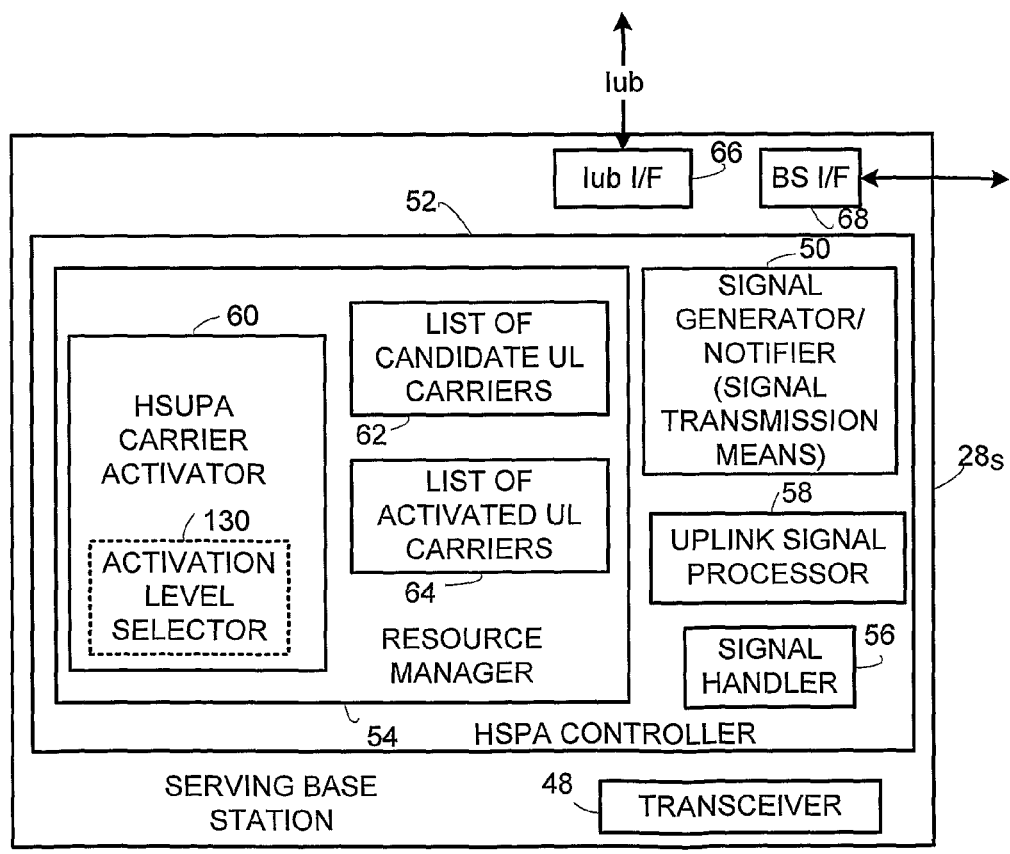
FIG. 5 is a schematic view of a particular implementation of a serving base station according to the example embodiment of FIG. 4.
Figure 6A:
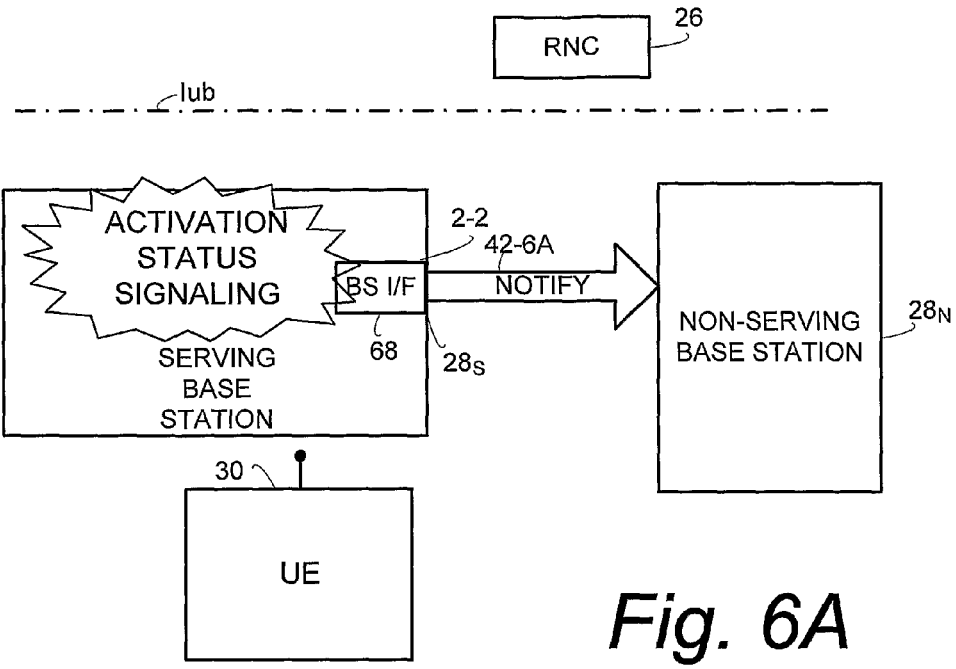
FIG. 6A and FIG. 6B are schematic views of differing ways of routing a notification signal from a serving base station to a non-serving base station.
Figure 6B:
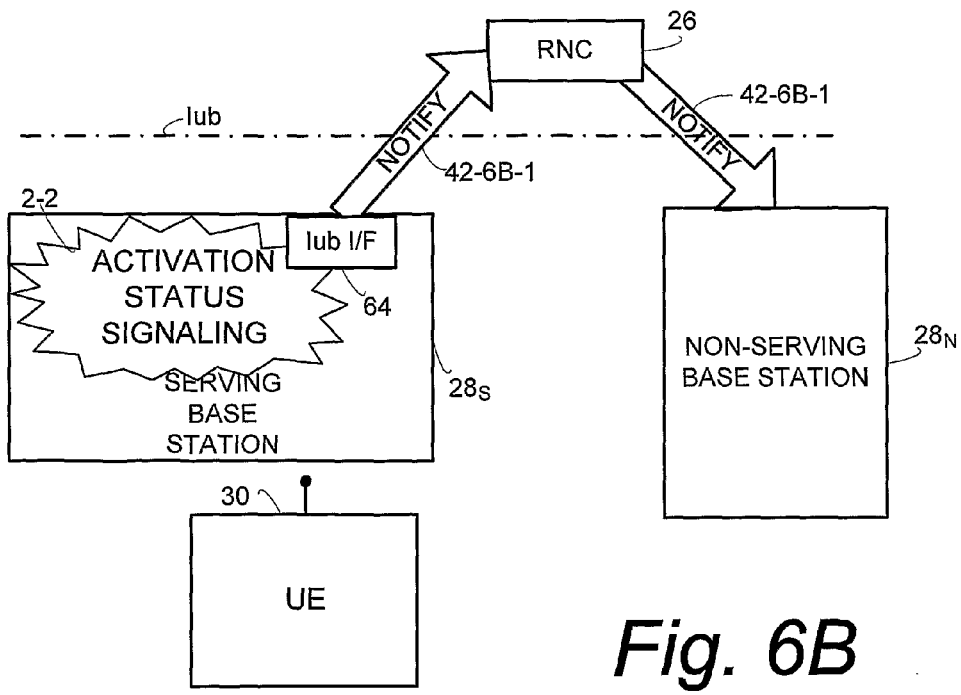

FIG. 5 shows a more detailed implementation of serving base station $28_S$. In the serving base station $28_S$ of FIG. 5 it is seen that the signal generator 50 (which serves, e.g., as the HSUPA carrier activation notification generator) can comprise or be realized by a computer-implemented controller such as HSPA controller 52. In addition to signal generator 50, the HSPA controller 52 can comprise HSPA resource manager 54; signal handler 56; and uplink signal processor 58. The serving base station $28_S$ also comprises an Iub interface/port 66 for connection to the radio network controller (RNC) node 26 (over the Iub interface) and an optional BS interface/port 68 for connection to non-serving base station $28_N$ (for communications between base stations). The signal handler 56 handles HSPA-related signals received either from Iub interface/port 66, the optional BS interface/port 68, or from a wireless terminal via receiver 48. The signal handler 56 particularly delegates the HSUPA carriers 36 received from wireless terminal 30 to uplink signal processor 58.

In an example implementation the HSPA resource manager 54 further comprises HSUPA carrier activator 60; a list of candidate uplink carriers 62; and a list of activated uplink carriers 64. The content of the list of candidate uplink carriers 62 is received from radio network controller (RNC) node 26, since the radio network controller (RNC) node 26 configures a pool of candidate uplink carriers for use as high speed uplink packet access (HSUPA) carriers. However, in the example embodiment of FIG. 5 the HSUPA carrier activator 60 determines which of the available, candidate uplink carriers on list of candidate uplink carriers 62 is/are actually to be activated for use by a particular wireless terminal, e.g. by wireless terminal 30. Those uplink carriers which are selected for activation are enrolled on list of activated uplink carriers 64.

It will be appreciated that HSPA controller 52 may govern various other aspect of HSPA operation of serving base station $28_S$, including downlink carrier (HSDPA) operation and other aspects of HSUPA. Only those aspects and functionalities of HSPA controller 52 generally germane to the technology disclosed herein are particularly discussed herein.

While the structure of the serving base station $28_S$ of FIG. 5 is particularly suited for a scenario such as that illustrated in FIG. 3A it will also be appreciated that the same or comparable structure can implement the scenario of FIG. 3D. For the FIG. 3D scenario, however, the serving base station $28_S$ need not comprise, or need not utilize, the HSUPA carrier activator 60 since in the FIG. 3D scenario the HSUPA carrier activation or deactivation (act 2-1) is accomplished or performed by wireless terminal 30.

Thus some of the example embodiments disclosed herein concern a serving base station which generates a sub-Iub generated HSUPA carrier activation notification. Correspondingly one of the aspects the technology disclosed herein concerns a method in a serving base station (such as serving base station $28_S$) for signal interaction with a non-serving base station (such as non-serving base station $28_N$). The method comprises the serving base station transmitting (to the non-serving base station) a signal comprising information indicating a subset of active carriers in the set of at least two carriers defined as feasible for uplink transmissions by the wireless terminal. The set of at least two uplink carriers can be the candidate carriers provided by the radio network controller (RNC) node 26 and maintained on list of candidate uplink carriers 62. The subset of uplink carriers in the set is at least one of the uplink carriers which is activated by the sub-Iub entity (e.g., HSUPA carrier activator 60 of serving base station $28_S$). The subset of uplink carriers can be, for example, two uplink carriers which are activated for HSUPA purposes for a particular wireless terminal. An example of such signal is sub-Iub generated HSUPA carrier activation notification 42.

When the serving base station $28_S$ is the generator of the notification signal 42, the routing of the sub-Iub generated HSUPA carrier activation notification can occur in several ways. In one example embodiment and mode illustrated in FIG. 6A the method in the serving base station further comprises transmitting the signal 42-6A directly to the non-serving base station $28_N$ on an interface (e.g., the BS interface) between serving base station $28_S$ and non-serving base station $28_N$. In another example embodiment and mode illustrated in FIG. 6B the method in the serving base station further comprises transmitting the notification signal in two stages: a first stage or first notification signal 42-6B-1 on an interface (e.g, the Iub interface) between serving base station $28_S$ and radio network controller (RNC) node 26 and a second stage or second notification signal 42-6B-2 for forwarding of the information to non-serving base station $28_N$ from radio network controller (RNC) node 26.

The timing of generation of the notification signal 42 by the serving base station $28_S$ also differs in differing embodiments and modes. For example, in one example embodiment and mode the method in the serving base station further comprises transmitting the notification signal 42 after the serving base station has decided to activate or deactivate at least one carrier in said set of at least two uplink carriers. This particular example embodiment and mode is depicted by FIG. 3A and understood with respect to the structure of FIG. 5, wherein the serving base station $28_S$ comprises HSUPA carrier activator 60 whereby the serving base station $28_S$ itself selects the uplink carriers to activates for HSUPA purposes. In another example embodiment and mode the method in the serving base station further comprises transmitting the notification signal 42 after the serving base station has received a signal from the wireless terminal 30 indicating activation or deactivation of at least one uplink carrier in the set of at least two uplink carriers. This particular example embodiment and mode is depicted by FIG. 3D, which illustrates reception of signal 70 from the wireless terminal 30 as the signal which indicates activation or deactivation of at least one uplink carrier in the set of at least two uplink carriers.

In another example embodiment the selection of uplink carrier for the MC-HSUPA is made by the wireless terminal (UE). The wireless terminal (UE) may be in a better position than the NodeBs (e.g., serving base station 28S) to activate and deactivate uplink carriers when conditions within the wireless terminal (UE) or at the wireless terminal (UE) location should be taken into account. Such conditions can include, e.g., transmit power limitation in the wireless terminal (UE) or the inter-cell interference situation around the wireless terminal (UE).

Figure 7:
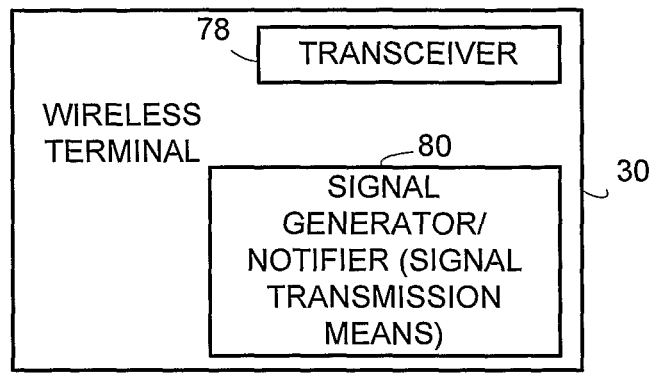
FIG. 7 is a schematic view of an example embodiment of a wireless terminal which is configured for multi carrier uplink transmissions and to send a HSUPA carrier activation notification to a non-serving base station.

FIG. 7 shows an example embodiment of a wireless terminal 30 which is configured for multi carrier uplink transmissions and to send a sub-Iub generated HSUPA carrier activation notification to the non-serving base station $28_N$. The wireless terminal 30 comprises transmitter 78 (included in a transceiver of FIG. 7) and signal generator 80. The transmitter 78 is configured to transmit a set of at least two uplink carriers (e.g., HSUPA carriers $36_1$ and $36_2$) over air the interface from wireless terminal 30 to non-serving base station $28_N$. The signal generator 80 (also known as an active uplink carrier notifier and/or the signal transmission means) is configured to signal non-serving base station $28_N$ with information indicating a subset of active carriers in the set of at least two carriers.

Figure 8:
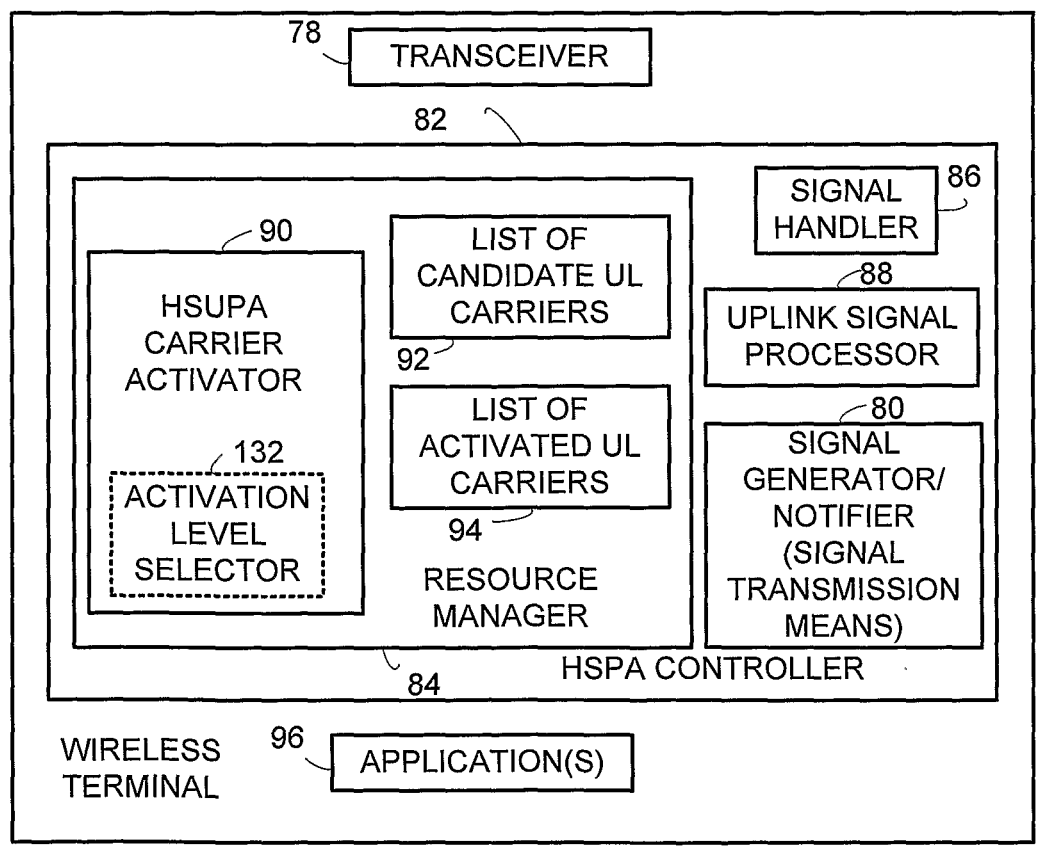
FIG. 8 is a schematic view of a particular implementation of a wireless terminal station according to the example embodiment of FIG. 7.

FIG. 8 shows a more detailed implementation of wireless terminal 30. In the 30 of FIG. 8 signal generator 80 (which serves, e.g., as the HSUPA carrier activation notification generator) can comprise or be realized by a computer-implemented controller such as HSPA controller 82. In addition to signal generator 80, the HSPA controller 82 can comprise HSPA resource manager 84; signal handler 86; and uplink signal processor 88. The signal handler 86 handles HSPA-related signals received from serving base station $28_S$. The uplink signal processor 88 prepares the HSUPA carriers 36 for forwarding to signal handler 86.

In an example implementation the HSPA resource manager 84 further comprises HSUPA carrier activator 90; a list of candidate uplink carriers 92; and a list of activated uplink carriers 94. The content of the list of candidate uplink carriers 92 is received from radio network controller (RNC) node 26, since the radio network controller (RNC) node 26 configures a pool of candidate uplink carriers for use as high speed uplink packet access (HSUPA) carriers. However, in the example embodiment of FIG. 8 the HSUPA carrier activator 90 determines which of the available, candidate uplink carriers on list of candidate uplink carriers 92 is/are actually to be activated for use by wireless terminal 30. Those uplink carriers which are selected for activation are enrolled on list of activated uplink carriers 94.

As with HSPA controller 52 of serving base station $28_S$, HSPA controller 92 may govern various other aspect of HSPA operation of wireless terminal 30, including downlink carrier (HSDPA) operation and other aspects of HSUPA. Only those aspects and functionalities of HSPA controller 92 generally germane to the technology disclosed herein are particularly discussed herein.

The wireless terminal 30 also includes one or more applications 96 which can be executed by a computer or processor. One or more of these applications 96 may invoke or participate in a service that involves HSUPA.

While the structure of the wireless terminal of FIG. 8 is particularly suited for a scenario such as that illustrated in FIG. 3B it will also be appreciated that the same or comparable structure can implement the scenario of FIG. 3C. For the FIG. 3C scenario, however, the wireless terminal 30 need not comprise, or need not utilize, the HSUPA carrier activator 90 since in the FIG. 3C scenario the HSUPA carrier activation or deactivation (act 2-1) is accomplished or performed by serving base station $28_S$.

Thus some of the example embodiments disclosed herein concern a wireless terminal 30 which generates a sub-Iub generated HSUPA carrier activation notification. Correspondingly one of the aspects the technology disclosed herein concerns a method in a wireless terminal (such as wireless terminal 30) for signal interaction with a non-serving base station (such as non-serving base station $28_N$). The method comprises the wireless terminal transmitting to the non-serving base station a notification signal 42 comprising information indicating a subset of active carriers in the set of at least two carriers defined as feasible for uplink transmissions by the wireless terminal.

The timing of generation of the notification signal 42 by the wireless terminal 30 also differs in differing embodiments and modes. For example, in one example embodiment and mode the method in the wireless terminal further comprises transmitting the notification signal 42 after the wireless terminal has decided to activate or deactivate at least one carrier in said set of at least two uplink carriers. This particular example embodiment and mode is depicted by FIG. 3B and understood with respect to the structure of FIG. 8, wherein the wireless terminal 30 comprises HSUPA carrier activator 90 whereby the wireless terminal 30 itself selects the uplink carriers to activate for HSUPA purposes. In another example embodiment and mode the method in the wireless terminal further comprises transmitting the notification signal 42 after the wireless terminal 30 has received a signal from the serving base station $28_S$ indicating activation or deactivation of at least one uplink carrier in the set of at least two uplink carriers. This particular example embodiment and mode is depicted by FIG. 3C, which illustrates reception of signal 100 from the serving base station $28_S$ as the signal which indicates activation or deactivation of at least one uplink carrier in the set of at least two uplink carriers.

Figure 9:
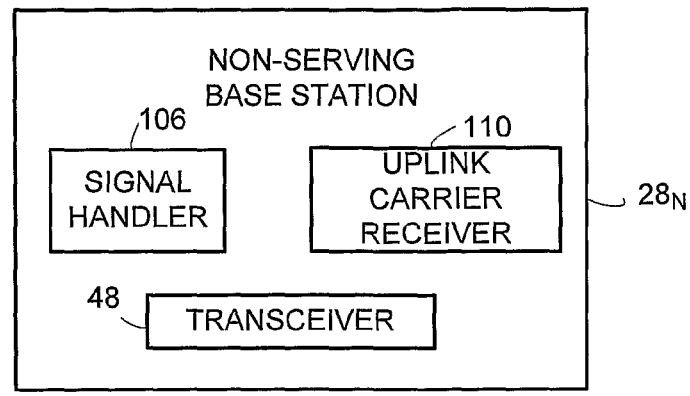
FIG. 9 is a schematic view of a non-serving base station according to an example embodiment which is configured to receive a HSUPA carrier activation notification.

FIG. 9 shows an example embodiment of a base station of a radio access network configured to control one or more non-serving cells in an active set of a wireless terminal, e.g., non-serving base station $28_N$. The non-serving base station base station comprises signal handler 106, receiver 108 (shown in FIG. 9 as being included in a transceiver), and carrier receiver 110. The carrier receiver 110 is also known as the carrier monitoring means. The signal handler 106 is configured to process a notification signal (such as any of the versions of notification signal 42 described herein or encompassed hereby). Such notification signal comprises information indicating a subset of active carriers in the set of at least two carriers transmitted by a wireless terminal configured for multi carrier uplink transmissions on the set of the at least two uplink carriers. The carrier receiver 110 is configured to adapt monitoring of uplink transmissions from wireless terminal 30 in accordance with the information.

Figure 10:
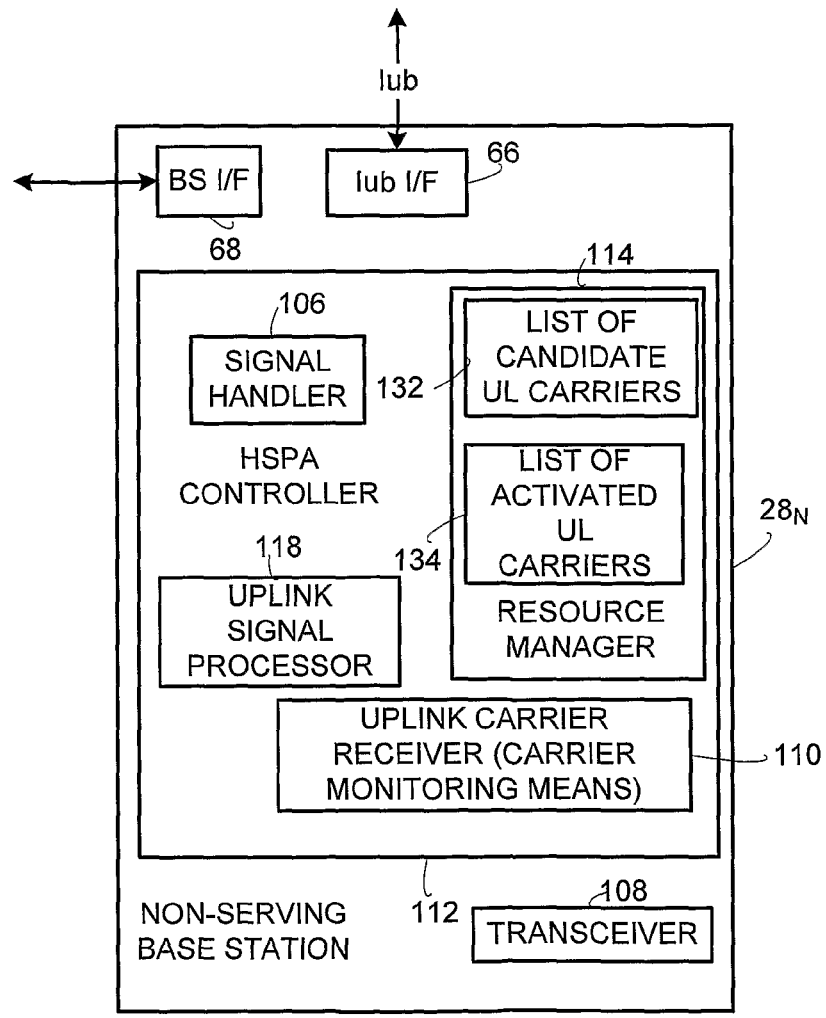
FIG. 10 is a schematic view of portions of a particular implementation of a non-serving base station according to the example embodiment of FIG. 9.

FIG. 10 shows a more detail implementation of non-serving base station $28_N$. In the non-serving base station $28_N$ of FIG. 10 the signal handler 106 which receives the sub-Iub generated HSUPA carrier activation notification 42 and the carrier receiver 110 can comprise or be realized by a computer-implemented controller such as HSPA controller 112. The HSPA controller 112 can also comprise HSPA resource manager 114 and uplink signal processor 118. The non-serving base station $28_N$ also comprises Iub interface/port 126 for connection to the radio network controller (RNC) node 26 (over the Iub interface) and an optional BS interface/port 128 for connection to serving base station $28_S$ (over an optional interface between base stations). The signal handler 116 handles HSPA-related signals received either from Iub interface/port 126, BS interface/port 128, or from a wireless terminal via receiver 108. The signal handler 116 particularly delegates the HSUPA carriers 36 received from wireless terminal 30 to uplink signal processor 58.

In an example implementation the HSPA resource manager 114 further comprises a list of candidate uplink carriers 132 and a list of activated uplink carriers 134. The content of the list of candidate uplink carriers 132 is received from radio network controller (RNC) node 26, since the radio network controller (RNC) node 26 configures a pool of candidate uplink carriers for use by the wireless terminal 30 as high speed uplink packet access (HSUPA) carriers. However, only those uplink carriers for which non-serving base station $28_N$ has received notification of activation are included on the list of activated uplink carriers 134.

It will be appreciated that HSPA controller 112 may govern various other aspect of HSPA operation of non-serving base station $28_N$, including both downlink carrier (HSDPA) operation and uplink carrier (HSUPA) operation for the $34_N$ served by non-serving base station $28_N$. To this end, it will be understood that the HSPA controller 112 can include other units and functionalities such as the HSPA controller 52 of serving base station $28_S$.

Thus some of the example embodiments disclosed herein concern a non-serving base station which receives a sub-Iub generated HSUPA carrier activation notification. Correspondingly one of the aspects the technology disclosed herein concerns a method in a non-serving base station (such as non-serving base station $28_N$). The method in the non-serving base station comprises the non-serving base station receiving a signal comprising information indicating a subset of active carriers in the set of at least two carriers.

The routing of the sub-Iub generated HSUPA carrier activation notification to the non-serving base station $28_N$ can occur in several ways. In some example embodiments and modes illustrated by the scenarios of FIG. 3B and FIG. 3C, in the notification signal 42 is an uplink signal received directly from the wireless terminal 30. In another example embodiment and mode illustrated by FIG. 6A, the notification signal 42-6A is received by the non-serving base station $28_N$ from the serving base station $28_S$ on an interface between the non-serving base station $28_N$ and the serving base station $28_S$ (e.g., the serving base station which controls a serving cell in the active set of the wireless terminal). In yet another example embodiment and mode illustrated by FIG. 6B, the notification signal 42-6B-1, 42-6B-2 is received on an interface (e.g., the Iub interface) between non-serving base station $28_N$ and radio network controller (RNC) node 26.

Figure 13:
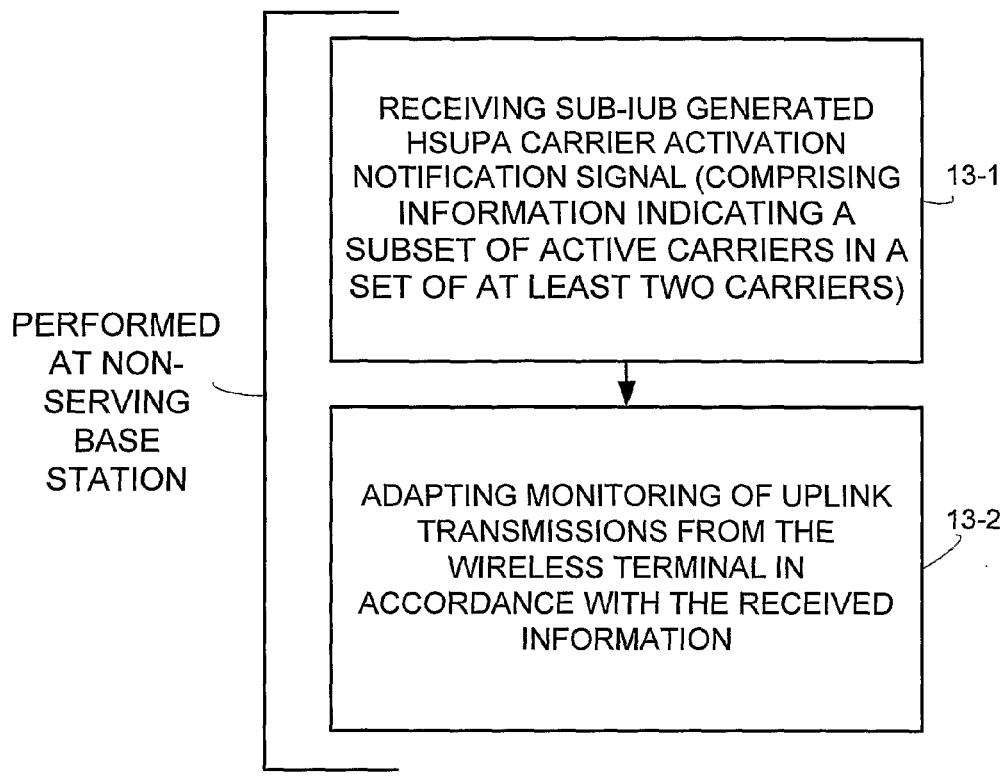
FIG. 13 is a flowchart showing general, representative acts or steps included in general method of operating a non-serving base station which receives a sub-Iub generated HSUPA carrier activation notification.

In an example embodiment and mode the method in the non-serving base station further comprises the representative acts shown in FIG. 13. Act 13-1 comprises the previously mentioned act of receiving the sub-Iub generated HSUPA carrier activation notification signal. Act 13-2 comprises adapting monitoring of uplink transmissions from the wireless terminal in accordance with the received information. In other words, the non-serving base station $28_N$ need not monitor or detect all the uplink carriers which the radio network controller (RNC) node 26 has configured for use as HSUPA uplink carriers, but only those which are included on the list of activated uplink carriers 134 which is maintained by non-serving base station $28_N$. Thus, the non-serving base station $28_N$ need not engage in blind and uniformed detection of activity on each possible uplink carrier, and therefore need not waste overhead or require additional allocation of resources.

Figure 11:
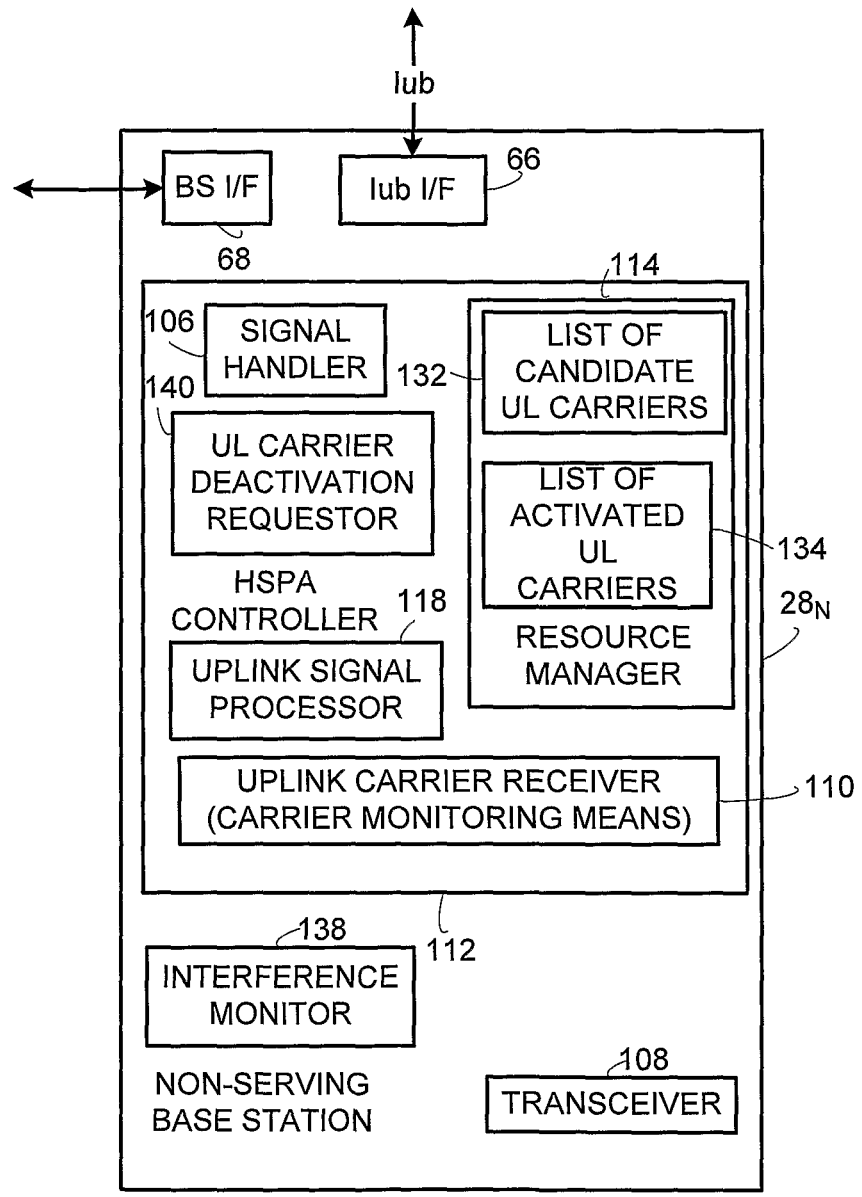
FIG. 11 is a schematic view of portions of an implementation of a non-serving base station having uplink carrier deactivation capability.
Figure 12A:
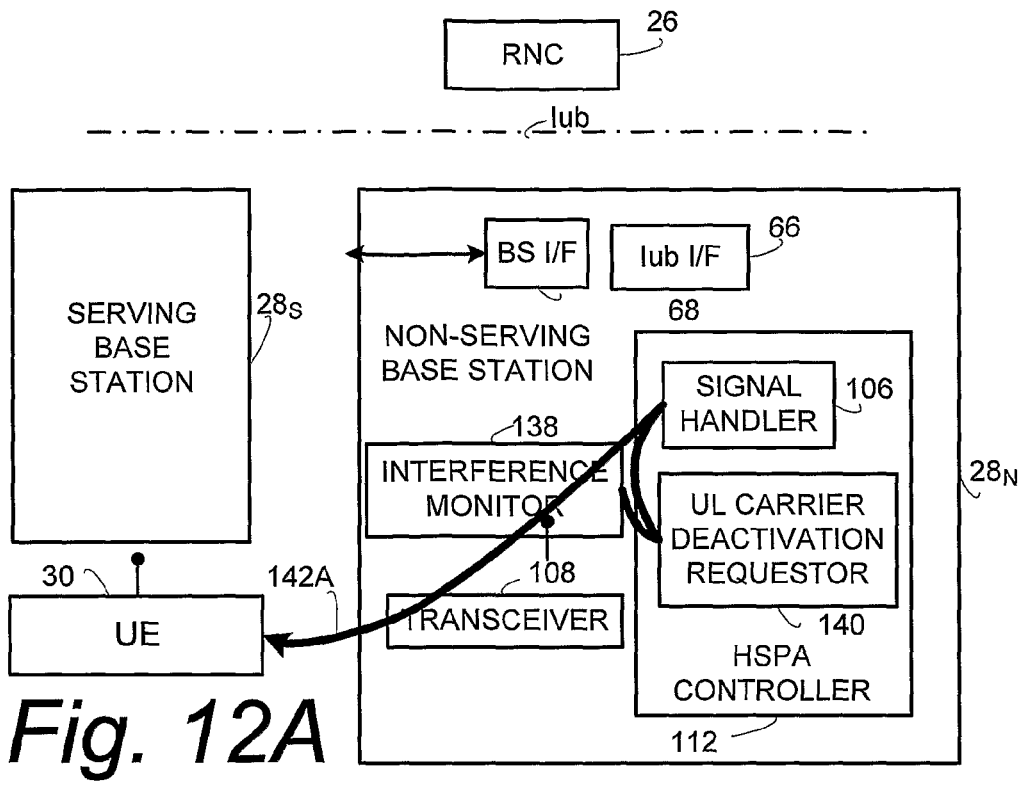
FIG. 12A, FIG. 12B, and FIG. 12C are diagrammatic views showing different ways of a non-serving radio base station transmitting a deactivation request signal.
Figure 12B:
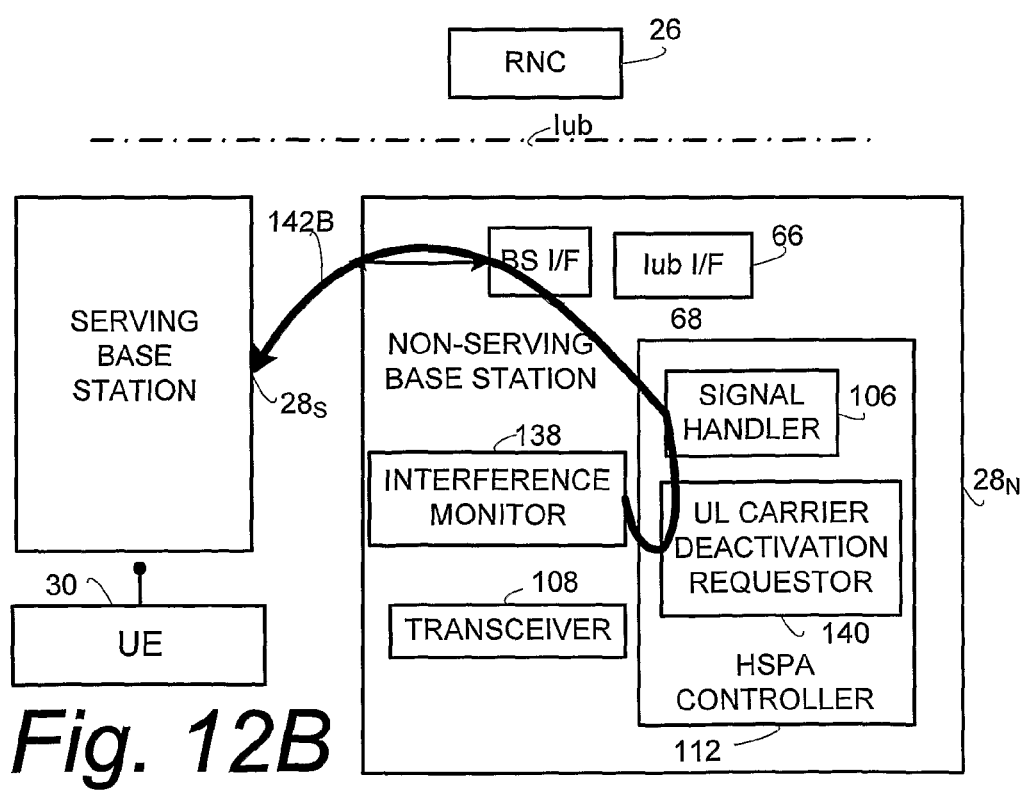
Figure 12C:
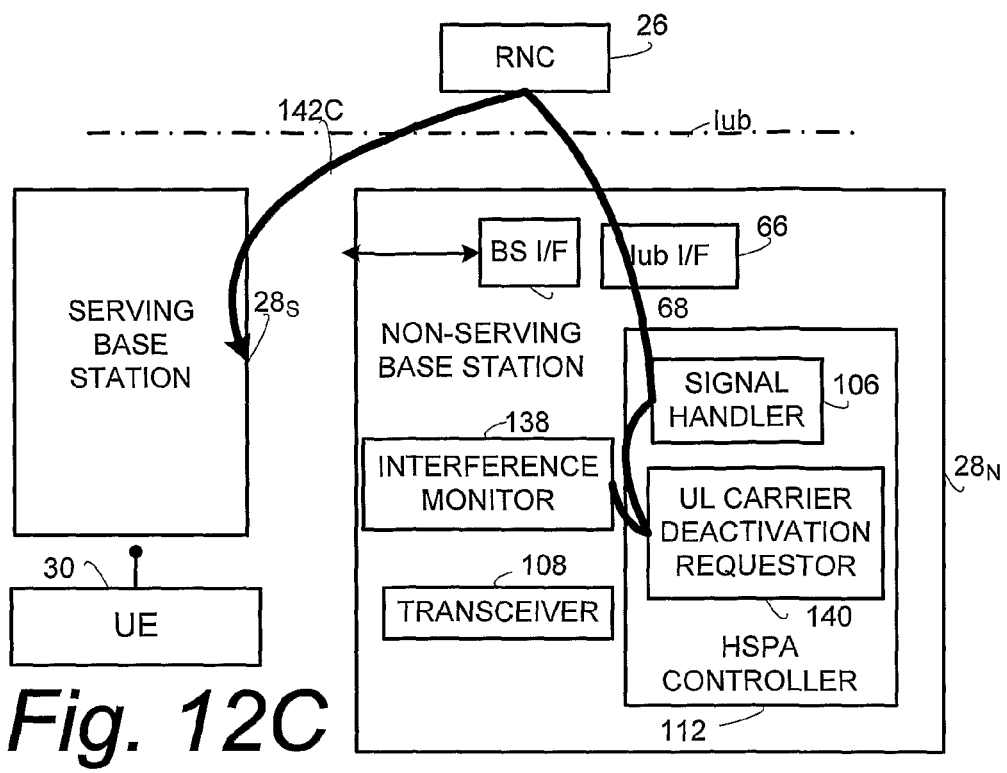

Additionally, in some embodiments, the non-serving NodeBs may have a say in deactivation of carriers in a similar way as the non-serving NodeBs in 3GPP Release 6/7/8 have a possibility to indicate overload using the E-RGCH channel, thereby lowering the grants for one or more non-served UEs. That is, the non-serving radio base station $28_N$ can request uplink carrier deactivation for a wireless terminal that the non-serving radio base station $28_N$ perceives as interfering too much. In this regard, FIG. 11 shows a variation of the non-serving radio base station of FIG. 10, i.e., non-serving radio base station $28_N(11)$ which further comprises interference monitor 138 and UL carrier deactivation requestor 140. When interference monitor 138 perceives that a wireless terminal is interfering too much, interference monitor 138 can notify UL carrier deactivation requestor 140 (which comprises HSPA controller 112) accordingly to prompt UL carrier deactivation requestor 140 to send a deactivation request signal 142 to the wireless terminal. The deactivation request signal 142 can either be sent from the non-serving radio base station $28_N$ directly to wireless terminal 30 as depicted by deactivation request signal 142A in FIG. 12A, or to the wireless terminal 30 via the serving radio base station $28_S$ as depicted by deactivation request signal 142B in FIG. 12B, or via the radio network controller node (RNC) 26 as depicted by deactivation request signal 142C in FIG. 12C.

It has been mentioned that the sub-Iub generated HSUPA carrier activation notification 42 comprises information indicating a subset of active carriers in the set of at least two carriers. As used herein, "activation status" can encompass an indication of whether the HSUPA uplink carrier is activated or deactivated. As one aspect of the technology disclosed herein, there can be several levels or degrees of uplink carrier utilization/activation. For example, in some example embodiments and modes the activation status comprises an indication of a level of activation utilization of a HSUPA uplink carrier, e.g., of an uplink carrier of the subset. In one example implementation the level of utilization indicates a type of channel that is activated for the uplink carrier of the subset. In another example implementation the level of utilization indicates a temporal dimension of the subset, e.g., "temporary deactivation" and "permanent deactivation". In another example implementation the activation status comprises carrier identification of the at least a subset of the uplink carrier in the set of the at least two uplink carrier. Thus, the level of uplink carrier utilization/activation can be expressed/allocated with respect to any of several quantities or measures, such as channel type/extent; temporal utilization.

Figure 14:
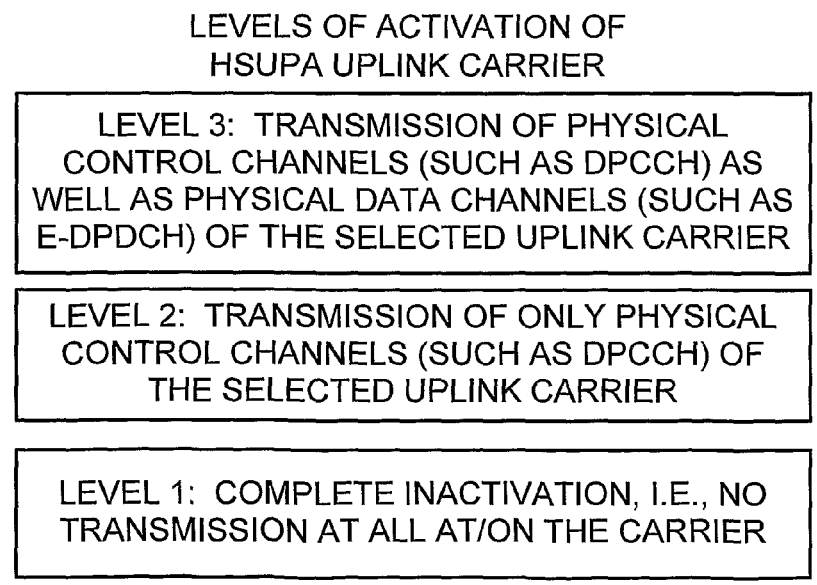
FIG. 14 is a diagrammatic view of illustrating that level or degree of uplink carrier utilization/activation can be expressed/allocated in accordance with channel type/extent of carrier utilization.

For example, in some example embodiments the level or degree of uplink carrier utilization/activation can be expressed/allocated in accordance with channel type/extent of carrier utilization. As illustrated in FIG. 14, an example first level (level 1) is complete inactivation, i.e., no transmission at all at/on the carrier. An example second level (level 2) involves transmission of only physical control channels (such as DPCCH) of the selected uplink carrier. An example third level comprises transmission of physical control channels (such as DPCCH) as well as physical data channels (such as E-DPDCH) of the selected uplink carrier.

Thus, via the sub-Iub generated HSUPA carrier activation notification 42 the non-serving NodeB (e.g., non-serving base station 28N) could either be provided with complete information of these different carrier activation levels or partial information only. In an example embodiment, providing complete information comprises providing (e.g., including in the notification signal 42) a level indication, such as one of levels 1-3 listed above and shown in FIG. 14. Thus, for level 1, in an example embodiment, providing only partial information comprises providing either an activated or deactivated status. For example, in an example implementation the deactivated status corresponds to level 1 while the activated status corresponds to level 2 or 3. Alternatively, in another example implementation the deactivated status corresponds to level 1 or level 2 while the activated status corresponds to level 3.

In other example embodiments the level or degree of uplink carrier utilization/activation can be expressed/allocated in a temporal dimension. One level or class of temporal activation can be temporary activation or temporary deactivation. In temporary (de)activation the wireless terminal (UE) can become transmit power limited, e.g. for coverage reasons. Another level or class of temporal activation can be permanent (de)activation, e.g. due to lack of NodeB resources.

These different levels may have different requirements on acceptable delays, acceptable overhead from associated signaling, etc.

For some embodiments, the HSUPA carrier activator of the sub-Iub entities which performs the activation or deactivation can comprise an activation level selector for implementing the level selection and prompting an inclusion of level selection in the notification signal 42. For this reason FIG. 5 shows (by broken lines) an optional activation level selector 130 in serving base station 28S and FIG. 8 shows (by broken lines) an optional activation level selector 132 in wireless terminal 30.

FIG. 15 shows a general, representative, non-limiting format for a notification signal such as the sub-Iub generated HSUPA carrier activation notification 42 described herein. The notification signal can comprise various fields or information elements, such as a signal type field, an addressee field; a sender identifier field; a field for identifying the activated HSUPA uplink carrier(s); and an optional level value field. The signal type field (which is optional) identifies the signal as being a sub-Iub generated HSUPA carrier activation notification 42. The level value field specifies a level value for those embodiments which include level differentiation and level selection (see FIG. 13). In some embodiments and modes the addressee field and/or the sender identifier field are also optional.

In one of its aspects the technology disclosed herein concerns signaling techniques for informing non-serving NodeBs (such as non-serving base station 28N) of the uplink carriers that are activated for a wireless terminal (UE). Description of signaling now follows for basic types of alternative embodiments and modes of signaling and signal routing.

In a first type of example signaling embodiment and mode, the notification signaling (e.g., the notification signal 42) occurs from the wireless terminal 30. Such example embodiments and modes are represented by FIG. 3B and FIG. 3C, for example. Indeed as described herein a wireless terminal 30 may report on an active carrier if a carrier is to be activated or deactivated. In some example embodiments this involves a specific layer one (L1) or layer two (L2) control signal in the uplink (UL), e.g. special indications or codewords on the existing physical control channels DPCCH, E-DPCCH or HS-DPCCH, or special field values in the MAC protocol for E-DCH.

If the carrier activation/deactivation decision is made in a NodeB such as the scenario shown in FIG. 3C, this alternative can also be characterized as signaling via the wireless terminal 30 since the wireless terminal 30 sends the carrier activation notification signal 42 which reflect the HSUPA uplink carrier selected by HSUPA carrier activator 60.

If the carrier activation/deactivation decision is made in the UE (as in the situation shown in FIG. 3B), the wireless terminal can autonomously decide whether to activate or deactivate a carrier (which could be useful for coverage reasons). This decision (whether to activate or deactivate an uplink carrier) could then be signaled not only to the non-serving NodeBs (e.g., 28*n*), but also to the serving NodeB (e.g., serving base station 28S).

In a second type of example signaling embodiment and mode, the notification signaling (e.g., the notification signal 42) occurs via the RNC (e.g., via radio network controller (RNC) node 26 and the Iub/Iur interfaces). This second type of signaling is reflected by FIG. 6B. The serving NodeB 28S can inform the RNC 26 (e.g., send the notification signal 42 to the RNC 26), which in turn signals the current subset of activated (or deactivated) carriers to non-serving NodeBs such as non-serving base station 28N.

In a third type of example signaling embodiment and mode, the notification signaling (e.g., the notification signal 42) directly between NodeBs. If an interface such as BS interface 68 is available between NodeBs, this interface can be used to directly signal the current subset of activated (or deactivated) carriers from serving NodeB to non-serving NodeBs.

If the carrier activation/deactivation decision is made in the wireless terminal in a manner such as shown in either of FIG. 3A or FIG. 3C, the second and third above-described signaling alternatives could be utilized as ways for NodeBs to assist each other if it becomes necessary to try to detect the presence of the carrier (since it is more likely that the UE message was received properly in at least one of the involved NodeBs than in all of them).

Different signal formats can be used in different embodiments for indicating activated/deactivated carriers. For example, with reference to the example format of FIG. 15, the activated HSUPA carrier(s) field can take the form of a bitmap as illustrated in FIG. 16. The bitmap can comprise N bits each respectively indicating which ones of the N uplink carriers that are activated and deactivated, respectively (with e.g. bit value '0' for a deactivated carrier and '1' for an activated carrier). In another embodiments indicating more than 2 levels of activation (see discussion above), a bitmap 134(17) may take the form shown in FIG. 17 and be extended accordingly (e.g. using 2 bits to represent the level of activation for each carrier). It is also possible to employ formats where only all activated carriers are listed (or alternatively only all deactivated carriers). Yet another alternative would be to indicate only changes in activation levels for the carriers as compared to the previous situation.

Thus, in one of its aspect the technology disclosed herein concerns a method of operating a radio access network comprising the acts of: selecting for activation or deactivation at least one uplink carrier of a set of at least two activated uplink carriers for multi carrier uplink transmissions from a wireless terminal (30). The method further comprises (2) at least initiating signaling to a non-serving base station of information indicating a subset of active carriers in the set of at least two carriers; performing act (1) and act (2) at one or more sub-Iub entity(ies), the sub-Iub entity(ies) comprising the wireless terminal and a serving base station, the serving base station being configured to control a serving cell in an active set of the wireless terminal; and wherein the non-serving base station is configured to control a non-serving cell in the active set of the wireless terminal.

Acts (1) and (2) can be distributed among the wireless terminal and the serving radio base station 28$_S$ in diverse manners and combinations. In one example embodiment and mode the method can further comprise performing act (1) and act (2) at the serving base station. In another example embodiment and mode the method can further comprise performing act (1) and act (2) at the wireless terminal. In another example embodiment and mode the method can further comprise performing act (1) at the serving base station and performing act (2) at the wireless terminal. In another example embodiment and mode the method can further comprise performing (1) at the wireless terminal and performing act (2) at the serving base station.

In an example embodiment and mode the activation status comprises an indication of a level of activation utilization of an uplink carrier of the subset.

In an example embodiment and mode the level of utilization indicates a type of channel that is activated for the uplink carrier of the subset.

In an example embodiment and mode the level of utilization indicates a temporal dimension for the uplink carrier of the subset.

By letting the serving NodeB or wireless terminal select the uplink carrier(s) in real-time, the resource utilization can be maximized: Control signaling overhead can be minimized, interference is lowered, and available capacity on all carriers can be fully utilized.

If the serving NodeB or wireless terminal selects the uplink carrier(s), it is advantageous to signal the current set of active carriers to non-serving cells for wireless terminals in soft handover. Otherwise the NodeBs which are handling non-serving cells will try to monitor signals that are not present, thus wasting scarce hardware resources and risking to send erroneous feedback information (such as transmit power control commands).

Furthermore, if a non-serving NodeB gets information about the activation of a carrier in accordance with the technology disclosed herein, that non-serving NodeB should be able to start receiving data on that carrier earlier than if it would have to first perform a reliable detection and decision before starting to receive data. The technology disclosed herein thus can result in improved uplink data reception performance.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly not to be unduly limited. Reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed hereby. Moreover, it is not necessary for a device or method to address each and every problem sought to be solved by the present invention, for it to be encompassed hereby.

The invention claimed is:

1. A method in a serving base station for signal interaction with a non-serving base station, the serving base station is configured to control a serving cell in an active set of a wireless terminal, the non-serving base station is configured to control one or more non-serving cells in the active set of the wireless terminal, the method comprising:

the serving base station transmitting to the non-serving base station a signal comprising information indicating a subset of active carriers in a set of at least two carriers being used by the wireless terminal for simultaneous multi-carrier uplink transmissions to both the serving base station and the non-serving base station;

the serving base station transmitting the signal after the serving base station has decided to activate or deactivate at least one carrier in said set of at least two carriers.

2. A method according to claim 1, further comprising transmitting the signal directly to the non-serving base station on an interface between the serving base station and the non-serving base station.

3. A method according to claim 1, further comprising transmitting the signal on an interface between the serving base station and a radio network controller node for forwarding of the information to the non-serving base station.

4. A method in a non-serving base station configured to control one or more non-serving cells in an active set of a wireless terminal, the method comprising:

the non-serving base station receiving a signal comprising information indicating a subset of active carriers in the set of at least two carriers being used by the wireless terminal for simultaneous multi-carrier uplink transmissions to both a serving base station and the non-serving base station;

the non-serving base station receiving the signal after the serving base station has decided to activate or deactivate at least one carrier in said set of at least two carriers.

5. A method according to claim 4, wherein the signal is received on an interface between the non-serving base station and a serving base station which controls a serving cell in the active set of the wireless terminal.

6. A method according to claim 4, wherein the signal is received on an interface between the non-serving base station and a radio network controller node.

7. A method according to claim 4, further comprising adapting monitoring of uplink transmissions from the wireless terminal in accordance with the received information.

8. A method in a wireless terminal for signal interaction with a non-serving base station the non-serving base station configured to control one or more non-serving cells in an active set of the wireless terminal, the method comprising:

the wireless terminal transmitting to the non-serving base station a signal comprising information indicating a subset of active carriers in a set of at least twocarriers, the wireless terminal is configured for multi carrier uplink transmissions by simultaneously transmitting on the active subset to both a serving base station and the non-serving base station;

the wireless terminal transmitting the signal after the serving base station has decided to activate or deactivate at least one carrier in said set of at least two carriers.

9. A method according to claim 8, wherein the information includes a list of all activated carriers in the set of at least two carriers.

10. A method according to claim 8, wherein the information includes a list of all deactivated carriers in the set of at least two carriers.

11. A method according to claim 8, wherein the information indicates changes in activation levels for the carriers as compared to a previous situation.

12. A base station of a radio access network configured to control a serving cell in an active set of a wireless terminal, the base station comprising:

a signal transmitter configured to transmit to a non-serving base station a signal with information indicating a subset of active carriers in a set of at least two carriers being used by the wireless terminal for simultaneous multi carrier uplink transmissions to both a serving base station and the non-serving base station; the non-serving base station being configured to control one or more non-serving cells in the active set of the wireless terminal;

the transmitter being configured to transmit the signal after the serving base station has decided to activate or deactivate at least one carrier in said set of at least two carriers.

13. A base station according to claim 12, wherein the signal is transmitted directly to the non-serving base station on an interface between the base station and the non-serving base station.

14. A base station according to claim 12, wherein the signal is transmitted on an interface between the base station and a radio network controller node for forwarding of the information to the non-serving base station.

15. A base station of a radio access network configured to control one or more non-serving cells in an active set of a wireless terminal, the base station comprising:

a signal handler configured to receive a signal comprising information indicating a subset of active carriers in a set of at least two carriers being used by the wireless terminal for simultaneous multi-carrier uplink transmissions to both a serving base station and the non-serving base station; and a carrier monitor configured to adapt monitoring of uplink transmissions from the wireless terminal in accordance with the information;

the signal handler being configured to receive the signal after the serving base station has decided to activate or deactivate at least one carrier in said set of at least two carriers.

16. A base station according to claim 15, wherein the signal is received on an interface between the base station and a serving base station which controls a serving cell in the active set of the wireless terminal.

17. A base station according to claim 15, wherein the signal is received on an interface between the base station and a radio network controller node.

18. A base station according to claim 12, wherein the information includes a list of all activated carriers in the set of at least two carriers.

19. A base station according to claim 12, wherein the information includes a list of all deactivated carriers in the set of at least two carriers.

20. A base station according to claim 12, wherein the information indicates changes in activation levels for the carriers as compared to a previous situation.

21. A wireless terminal configured for multi carrier uplink transmissions on a set of at least two carriers and having an active set comprising one or more non-serving cells controlled by a non-serving base station, the wireless terminal comprising:

a signal transmitter configured to transmit a signal to the non-serving base station, the signal comprising information indicating a subset of active carriers in the set of at least two carriers, the wireless terminal being configured for multi carrier uplink transmissions by simultaneously transmitting on the active subset to both a serving base station and the non-serving base station;

the signal transmitter being configured to transmit the signal after the serving base station has decided to activate or deactivate at least one carrier in said set of at least two carriers.

* * * * *